A. D. McMASTER.

Stove-Boards.

No. 5,980. Reissued July 21, 1874.

Witnesses.
R. F. Osgood.
Louis Spahn.

Inventor:
Alonzo D. McMaster

THE GRAPHIC CO. PHOTO-LITH. 39 & 41 PARK PLACE, N.Y.

UNITED STATES PATENT OFFICE.

ALONZO D. McMASTER, OF ROCHESTER, NEW YORK.

IMPROVEMENT IN STOVE-BOARDS.

Specification forming part of Letters Patent No. 134,299, dated December 24, 1872; reissue No. 5,980, dated July 21, 1874; application filed July 3, 1874.

*To all whom it may concern:*

Be it known that I, ALONZO D. McMASTER, of the city of Rochester, in the county of Monroe and State of New York, have invented a new and valuable Improvement in Stove-Boards; and I do hereby declare that the following is a full, clear, and exact description of the construction and operation of the same, reference being had to the accompanying drawing, making a part of this specification, and to the letters and figures of reference marked thereon.

Figure 1:
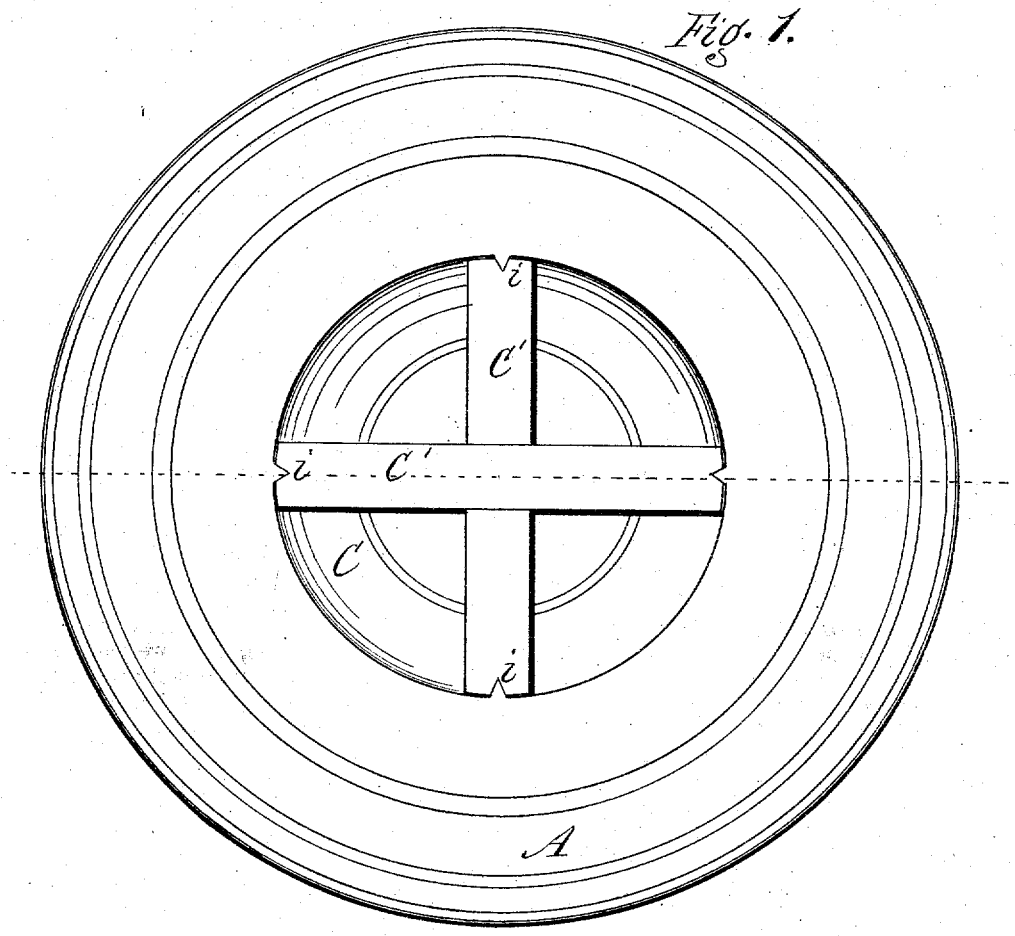
Figure 2:
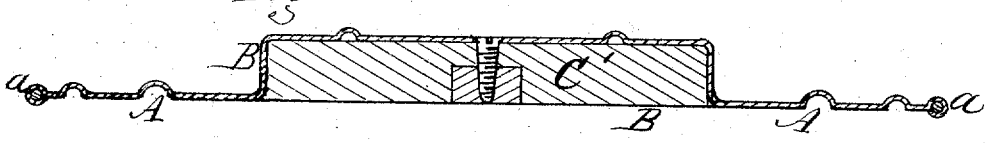

Figure 1 of the drawing is a representation of a bottom view of my invention. Fig. 2 is a sectional view of the same.

This invention has relation to a metallic stove-board to be placed on the floor underneath a stove; and the novelty consists in the raising of the center of the board by swaging, spinning, or otherwise, and bracing the same by means of ties, as hereinafter more fully described; also, in the means of securing the ties in place, as hereinafter set forth.

Referring to the drawing, A designates the rim of a zinc or other sheet-metal stove-board, which rim lies close to the floor and receives the legs of the stove. To strengthen said rim and cause it to lie close to the floor, a stout wire, *a*, is applied to the outer edge, and secured in place by folding over these edges upon and around it. B designates the central portion of the stove-board, which lies between the stove-legs, and which is raised by swaging or other process, so as to provide an air-space, C, of a cylindrical form underneath, for the protection of the floor from the effects of the heat, and to receive the support or stiffening-ties placed therein. C′ designates ties traversing the cavity C, and used to prevent the metal from sagging. These ties may be of wood or other material, and may be secured by means of screws or nails D, and by having recesses in their ends to receive lugs or studs *i*, formed by attaching drops of solder to the raised sides or walls of the cavity C.

This sheet-metal stove-platform may be spun up in a lathe in a cylindrical shape, and with a raised center, and with ribs or beads, as shown on the drawing, which ribs add strength and firmness to the board.

One essential novelty in my invention consists, in combination with a stove-board having an outer rim lying flat on the floor, and having a raised center, of ties, or a support which fits in the said center to preserve the integrity of the same, and prevents sagging, giving also the proper ballast and stiffness to the central portion, while the outer rim is free to adapt itself to the floor.

Another feature consists in combining, with a stove-board thus constructed, a wired outer edge, so that the flat rim will be kept straight and in proper position at all times.

Having thus described my invention, I do not claim a sheet-metal stove-board stretched over a wooden support and presenting a plain surface on top; but

What I claim as my invention is—

1. In a sheet-metal stove-board constructed with a flat outer rim, A, and a raised center, C, the combination, with the said raised center, of ties, or a support which fits therein, for the purpose of sustaining the same, as specified.

2. In a stove-board constructed with a flat rim, A, a central chamber, C, and with ties for supporting the chamber, the combination, with the chamber and ties, of recesses to receive the lugs *i*, as herein described.

ALONZO D. McMASTER.

Witnesses:
R. F. OSGOOD,
LOUIS SPAHN.